United States Patent [19]

Furukawa et al.

[11] 4,393,823
[45] Jul. 19, 1983

[54] SUCTION VALVE SEAT LUBRICATING APPARATUS

[75] Inventors: Hideo Furukawa; Kazuo Chikugo; Yoichi Otsuki, all of Oyama, Japan

[73] Assignee: Kabushiki Kaisha Komatsu Seisakusho, Tokyo, Japan

[21] Appl. No.: 275,103

[22] Filed: Jun. 18, 1981

[30] Foreign Application Priority Data

Jun. 25, 1980 [JP] Japan .................... 55-88156[U]

[51] Int. Cl.³ ........................................ F01M 1/00
[52] U.S. Cl. ............................ 123/196 M; 123/52 M
[58] Field of Search ........... 123/196 M, 179 H, 180 R, 123/52 M

[56] References Cited

U.S. PATENT DOCUMENTS

| | | | |
|---|---|---|---|
| 2,194,007 | 3/1940 | Clementson | 123/196 M |
| 3,297,011 | 1/1967 | Gray | 123/180 R |
| 3,999,531 | 12/1976 | Taylor | 123/196 M |

*Primary Examiner*—Charles J. Myhre
*Assistant Examiner*—E. Rollins Cross
*Attorney, Agent, or Firm*—Balogh, Osann, Kramer, Dvorak, Genova, Traub

[57] ABSTRACT

A suction valve seat lubricating apparatus for a multi-cylinder diesel engine wherein a small amount of lubricant is introduced into a suction manifold and it is carried by the compressed suction air to suction valve seats to lubricate them. A partition wall is disposed within the suction manifold for dividing the same into two chambers. Each chamber has a lubricant supply nozzle connected thereto.

2 Claims, 4 Drawing Figures

SUCTION VALVE SEAT LUBRICATING APPARATUS

BACKGROUND OF THE INVENTION

This invention relates to an air suction valve lubricating device wherein lubricant is supplied into the air flow through suction ports so as to prevent the wear of seats of suction valves.

In diesel engine, in general, suction valves are arranged to repeatedly strike against the seats of valve inserts.

Therefore, countermeasures for improving the durability of the valve inserts against the impact load exerted thereon by selecting the material and shape thereof have heretofore been taken.

Further, a system of lubricating the seats of suction valves with the oil component contained in the exhaust gas from the engine by flowing back part of the exhaust gas to the side of suction ports has recently been proposed. However, this system has been disadvantageous in that in case of diesel engines provided with a turbocharger and an oil cooler the compressor's blades of the turbocharger and the oil cooler will be stained by the exhaust gas for a short time of use.

SUMMARY OF THE INVENTION

It is therefore an object of the present invention to provide a suction valve seat lubricating apparatus for a diesel engine which can overcome the above noted problems of the prior art.

Another object of the present invention is to provide a suction valve seat lubricating apparatus for a diesel engine wherein a small amount of lubricant is introduced into a suction air thereby lubricating a valve seat for a suction valve.

A further object of the present invention is to provide a suction valve seat lubricating apparatus for a diesel engine wherein durability of a suction valve and a valve seat can be significantly improved by providing a sufficient lubrication thereto.

In accordance with an aspect of the present invention, there is provided a suction valve seat lubricating apparatus for a diesel engine comprising a plurality of cylinders, a turbocharger, a compressor driven by the turbocharger for compressing a suction air, a suction manifold connected to the compressor, a plurality of cylinder heads each having a suction port and a valve insert with a valve seat formed therein, each suction port being connected to the suction manifold and a plurality of suction valves each adapted to intermittently seat on the respective valve seats wherein said cylinders are divided into first and second groups each group having a plurality of cylinders with different phase of suction strokes from one to another, a partition wall disposed in the suction manifold dividing the same into first and second chambers, the first chamber being communicated with the first group of cylinders and the second chamber being communicated with the second group of cylinders, and a pair of lubricant supply means each connected to and open within the first or second chamber for supplying lubricant thereinto whereby supplied lubricant may be carried by the suction air to the respective valve seats so as to lubricate the same.

In accordance with this particular aspect or embodiment of the invention, there is no overlap in suction stroke between the first group cylinders, as well as between the second group cylinders. Therefore, it is only necessary to provide one lubricant supply means for each group of cylinders.

The above and other objects, features and advantages of the present invention will be readily apparent from the following description taken in conjunction with the accompanying drawings.

DESCRIPTION OF THE PREFERRED EMBODIMENTS

Figure 1:
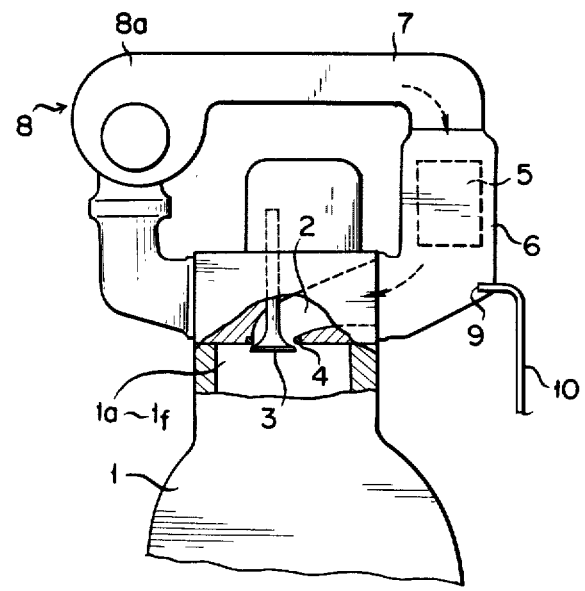
FIG. 1 is a schematic front elevational view of a diesel engine incorporating a suction valve seat lubricating apparatus of the present invention with a suction valve portion being cut away.
Figure 2:
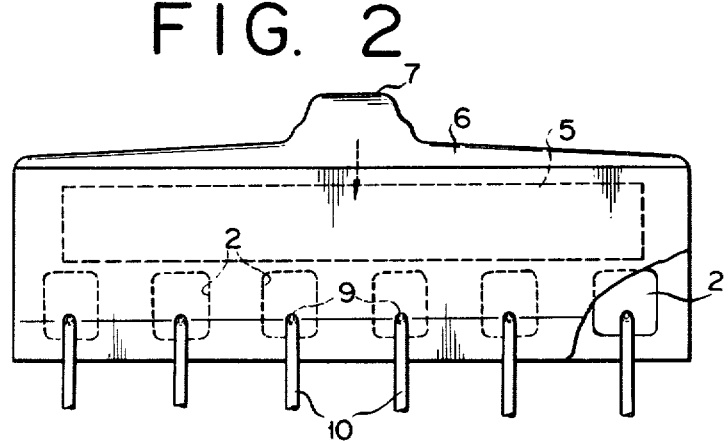
FIG. 2 is a side elevational view of the embodiment of FIG. 1.

The present invention will now be described below by way of examples only with reference to the accompanying drawings.

In the drawings, reference numeral 1 denotes a diesel engine body comprising cylinders 1a to 1f, each of which has an air suction port 2 formed therein. Mounted in each of the openings of the air suction ports 2 on the side of the cylinders 1a to 1f is an air suction valve 3 adapted to be opened and closed by the action of cam means not shown, and fitted to each of the openings with which the air suction valve 3 is brought into contact is a valve insert 4. The above-mentioned air suction ports 2 are connected through an air suction manifold 6 having an aftercooler 5 accommodated therein and an air suction pipe 7 to a compressor 8a of a turbocharger 8. Further, a lubricant supply nozzle 9 is arranged to open inside the air suction manifold 6 on the downstream side of the aftercooler 5 for each air suction port 2. Each lubricant supply nozzle 9 is connected through a lubricant supply pipe 10 to a lubricant supply source. The arrangement is made such that when the engine is running a small amount of lubricant is supplied through each lubricant supply nozzle 9 into the air drawn into the engine's cylinder through each air suction port 2.

The lubricant supplied through the lubricant supply nozzles 9 is required to have a pressure higher than that of the air within the air suction manifold 6. The lubricant supplied through each of the nozzles 9 is carried to and deposited on the seat of the valve insert 4 thereby forming an oxide film thereon. The oxide film thus formed acts to lubricate properly the surface of the seat of the valve insert 4. The amount of supply of the lubricant to be fed into the air drawn into the cylinder should be adjusted depending on the size or output of the engine, but an extremely small amount of about 0.05 to 0.2 cc/PS·H is sufficient to meet the purpose of lubrication.

Figure 3:
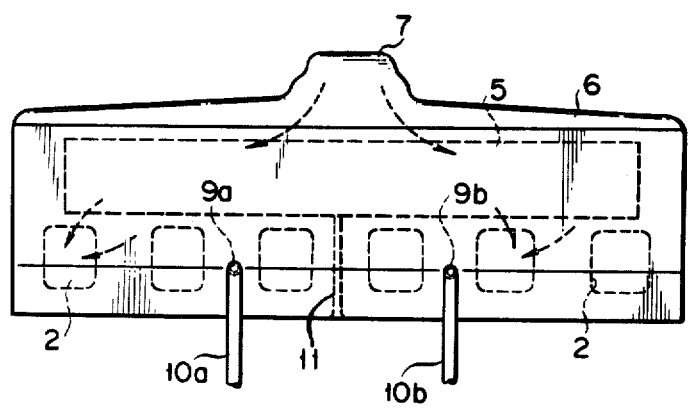
FIG. 3 is similar to FIG. 2 but showing another embodiment of the present invention.

FIG. 3 shows another embodiment of the present invention. In this embodiment, a partition wall 11 is provided within the air suction manifold 6. A lubricant supply nozzle 9a is provided for a first cylinder group consisting of cylinders 1a, 1b and 1c on the left side, whilst a lubricant supply nozzle 9b is provided for a second cylinder group comprised of cylinders 1d, 1e and 1f on the right side. In case of the aforementioned first embodiment, a lubricant supply nozzle has to be provided for each cylinder, and therefore provision of a plural number of lubricant supply pipes corresponding to the number of the nozzles are required, which results in a complicated construction of the engine and a considerable increase in manufacturing cost thereof.

However, in the case of most multi-cylinder engines, for the purpose of reducing the fluctuations in the torque of the engine, it has been the normal practice to arrange that the ignition timing and hence the suction stroke of adjoining cylinders do not overlap each other. In such a case, if each moment during the operation of the engine is envisaged, the air flow within the air suction manifold is concentrated in a particular cylinder.

Figure 4:
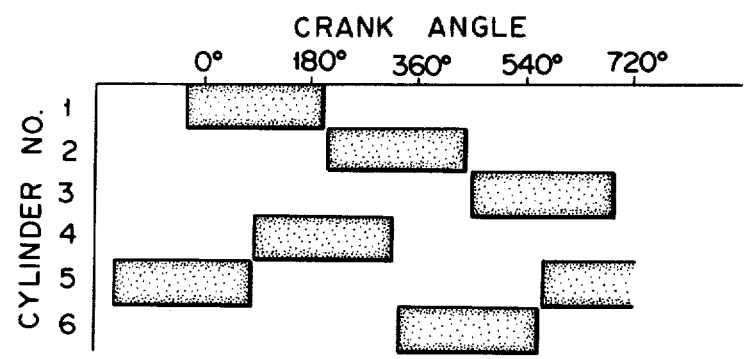
FIG. 4, shows diagramatically the condition of a 6-cylinder engine at the suction stroke thereof.

FIG. 4 shows diagrammatically the condition of a 6-cylinder engine at the suction stroke thereof. In the case of the engine shown in FIG. 4, there is no overlap in suction stroke between the first group cylinders, namely, Nos. 1, 2 and 3 cylinders, and the same is applicable to the second group cylinders, namely, Nos. 4, 5 and 6 cylinders. Therefore, as in the case of the embodiment shown in FIG. 3, it is only necessary to provide one lubricant supply nozzle for No. 1 cylinder 1a, No. 2 cylinder 1b and No. 3 cylinder 1c, and also one for No. 4 cylinder 1d, No. 5 cylinder 1e and No. 6 cylinder 1f.

As can be seen from FIG. 4, the suction stroke of No. 1 cylinder 1a overlaps those of No. 4 cylinder 1d and No. 5 cylinder 1e. Therefore, the air flow when No. 1 cylinder 1a and No. 5 cylinder 1e draw air therein at the same time is shown by arrows in FIG. 3. In this case, the lubricant supplied from a lubricant supply nozzle 9a through a lubricant supply tube 10a is fed into No. 1 cylinder 1a, whilst that from a lubricant supply nozzle 9b through a lubricant supply tube 10b is fed into No. 5 cylinder 1e.

By thus providing lubricant supply nozzles 9a and 9b, the lubricant can be fed uniformly into each air suction valve 3 without having to provide one lubricant supply nozzle for each cylinder.

As mentioned in detail hereinabove, according to the present invention, a lubricant supply nozzle 9 is located in the vicinity of the air suction port 2 so as to supply a small amount of lubricant into the air flow through the air suction port 2 so that the air suction valve 3 and the seat of the valve insert 4 can be properly lubricated thereby enabling prevention of the wear of the seat to be achieved and also the durability of the air suction valves 3 and the valve inserts 4 to be improved further. Besides, as compared with the conventional system wherein part of the exhaust gas can be flowed back to the air suction ports 2, there is no possibility of staining of the aftercooler and the turbocharger.

It is to be understood that the foregoing description is merely illustrative of the preferred embodiments of the invention and the invention is not to be limited thereto, but is to be determined by the scope of the appended claims.

What is claimed is:

1. In a diesel engine including a plurality of cylinders, a turbocharger, a compressor driven by the turbocharger for compressing a suction air, a suction manifold connected to the compressor, a plurality of cylinder heads each having a suction port and a valve insert with a valve seat formed therein, each suction port being connected to the suction manifold and a plurality of suction valves each adapted to intermittently seat on the respective valve seats wherein said cylinders are divided into first and second groups each group having a plurality of cylinders with different phase of suction strokes from one to another and having no overlap therebetween; a suction valve seat lubricating apparatus comprising a partition wall disposed in said suction manifold dividing the same into first and second chambers, said first chamber being communicated with said first group of cylinders and said second chamber being communicated with said second group of cylinders, and a pair of lubricant supply means each connected to and open within said first or second chamber for supplying lubricant thereinto whereby supplied lubricant may be carried by the suction air to the respective valve seats sequentially so as to lubricate the same.

2. A suction valve seat lubricating apparatus as recited in claim 1 wherein each of said lubricant supply means is in the form of nozzle and lubricant pressure at the nozzle is higher than the suction air pressure at the nozzle.

* * * * *